United States Patent
Skillsäter et al.

(10) Patent No.: US 12,014,317 B2
(45) Date of Patent: Jun. 18, 2024

(54) METHOD AND SYSTEM FOR CONTROLLING UNLOADING OF A LOAD-CARRYING VEHICLE

(71) Applicant: Volvo Construction Equipment AB, Eskilstuna (SE)

(72) Inventors: Calle Skillsäter, Torshälla (SE); Andreas Norrman, Arboga (SE)

(73) Assignee: Volvo Construction Equipment AB, Eskilstuna (SE)

( * ) Notice: Subject to any disclaimer, the term of this patent is extended or adjusted under 35 U.S.C. 154(b) by 371 days.

(21) Appl. No.: 17/434,611

(22) PCT Filed: Mar. 4, 2019

(86) PCT No.: PCT/EP2019/055252
§ 371 (c)(1),
(2) Date: Aug. 27, 2021

(87) PCT Pub. No.: WO2020/177847
PCT Pub. Date: Sep. 10, 2020

(65) Prior Publication Data
US 2022/0147931 A1 May 12, 2022

(51) Int. Cl.
*G06Q 10/0835* (2023.01)
*B60W 60/00* (2020.01)
*G01F 23/00* (2022.01)

(52) U.S. Cl.
CPC ... *G06Q 10/08355* (2013.01); *G01F 23/0007* (2013.01); *B60W 60/00256* (2020.02); *B60W 2556/45* (2020.02)

(58) Field of Classification Search
CPC ......... G06Q 10/08355; G01F 23/0007; B60W 2556/45; B60W 60/00256
See application file for complete search history.

(56) References Cited

U.S. PATENT DOCUMENTS

| | | | |
|---|---|---|---|
| 4,909,449 A | 3/1990 | Etheridge | |
| 6,484,078 B1 * | 11/2002 | Kageyama | G08G 1/20 701/25 |

(Continued)

FOREIGN PATENT DOCUMENTS

| | | |
|---|---|---|
| CN | 102066885 A | 5/2011 |
| CN | 104573944 A | 4/2015 |

(Continued)

OTHER PUBLICATIONS

International Search Report and Written Opinion of the International Searching Authority, PCT/EP2019/055252, mailed Jul. 1, 2019, 17 pages.

(Continued)

*Primary Examiner* — Dale W Hilgendorf
*Assistant Examiner* — Hana Lee
(74) *Attorney, Agent, or Firm* — Sage Patent Group

(57) ABSTRACT

A method and system for controlling unloading of a vehicle transporting a load of unprocessed material from a first location to a second location are described, wherein the second location includes a material processing device and a storage for unprocessed material. The method includes receiving a signal indicative of a level of unprocessed material contained in the material processing device; determining, based on the signal, whether an estimated level of unprocessed material contained in the material processing device is below or above a threshold at an estimated time of arrival of the vehicle at the material processing device; and, directing the vehicle towards the material processing device when the estimated level of unprocessed material contained in the material processing device is below the first threshold; or directing the vehicle towards the storage when the estimated level of unprocessed material contained in the material processing device is above the first threshold.

21 Claims, 3 Drawing Sheets

(56) References Cited

U.S. PATENT DOCUMENTS

| | | | |
|---|---|---|---|
| 2013/0054133 A1* | 2/2013 | Lewis | G01C 21/3407 |
| | | | 701/423 |
| 2016/0239023 A1* | 8/2016 | Rylander | G01C 21/34 |
| 2017/0072826 A1* | 3/2017 | Humphrey | B60P 1/283 |
| 2021/0174279 A1* | 6/2021 | Hill | G06Q 10/103 |

FOREIGN PATENT DOCUMENTS

| | | |
|---|---|---|
| CN | 105900031 A | 8/2016 |
| CN | 109191826 A | 1/2019 |
| WO | 2015065251 A1 | 5/2015 |

OTHER PUBLICATIONS

Robertson, Tanya, "What is Buffering in Manufacturing?", web article retrieved from the Internet on Jun. 6, 2019 at: https://webcache.googleusercontent.com/search?q=cache:YAld1IGjtjcJ:https://smallbusiness.chron.com/buffering-manufacturing-31892.html+&cd=1&hl=en&ct=clnk&gl=de&client=firefox-b, 4 pages.

Hulthén, Erik, "Thesis for the Degree of Doctor of Philosophy in Product and Production Development Real-Time Optimation of Cone Crushers," Department of Product and Production Development, Chalmers University of Technology, Göteborg, Sweden, Nov. 2010, 63 pages.

Hawk Measurement Systems Australia, "Reliable level of measurement for crusher control," web article retrieved from the Internet on Jun. 6, 2019 at: https://web.archive.org/web/20180713105925if_/http:www.hawkmeasure.com:80/files/Crusher.pdf, 1 page.

International Preliminary Report on Patentability of the International Preliminary Examining Authority, PCT/EP2019/055252, mailed Jun. 18, 2020, 9 pages.

First Chinese Office Action dated Dec. 18, 2023 for Chinese Patent Application No. CN 201980093046.3, 35 pages (including English translation).

* cited by examiner

METHOD AND SYSTEM FOR CONTROLLING UNLOADING OF A LOAD-CARRYING VEHICLE

CROSS REFERENCE TO RELATED APPLICATIONS

This application is a 35 U.S.C. § 371 national stage application of PCT International Application No. PCT/EP2019/055252 filed on Mar. 4, 2019, the disclosure and content of which is incorporated by reference herein in its entirety.

TECHNICAL FIELD

The invention relates to a method and system for controlling unloading of at least a first load-carrying vehicle transporting a load of unprocessed material from a first location to a second location, wherein the second location comprises a first unloading target in the form of a material processing device and a second unloading target in the form of a local storage for unprocessed material.

The invention is in particular intended for a construction site where the load-carrying vehicle is a hauler or dump truck carrying rock fragments or similar and where the material processing device is a crusher.

BACKGROUND

Load-carrying and loading working machine vehicles in the form of articulated haulers, wheel loaders, trucks and dumpers are frequently used for loading and transporting of material loads at construction sites and the like. A load-receiving container of a hauler or dump truck may for instance be loaded with unprocessed material, such as rock fragments, at a loading location, transport the material to a another location and dump the material at a storage pile or (in)to a material processing device, such as into a buffering feeder of a crusher arranged to crush the rock fragments into smaller fragments.

Efficient production and utilization of equipment requires that material processing devices do not run out of unprocessed material and that vehicles do not have to line up and wait at loading or unloading. WO2015/065251 addresses this issue and proposes calculating an estimated time of arrival for vehicles at some target destination, transmitting between the vehicles information about estimated times of arrivals for various vehicles, and adapting the speed of the vehicles to avoid waiting time or that a crusher goes empty and to save energy/fuel (when decreasing the speed).

Although the method disclosed in WO2015/065251 seems useful and may solve some of the issues related to control of construction site vehicles and equipment there is still a need for improvements. For instance, an issue not addressed in WO2015/065251 is where there is a local buffer storage for unprocessed material arranged in connection with a material processing device and it needs to be decided at some point whether the vehicle should be directed to dump its load directly into the processing device, which may result in that the vehicle must line up and wait before dumping, or if it should be directed to dump its load at the local storage for later loading into the processing device, which requires additional resources involving e.g. a local wheel loader that moves material from the local storage to the processing device.

SUMMARY

An object of the invention is to provide a method and system for controlling unloading of at least a first load-carrying vehicle transporting a load of unprocessed material from a first location to a second location, wherein the second location comprises a first unloading target in the form of a material processing device and a second unloading target in the form of a local storage for unprocessed material, which method/system has the potential of further increasing production efficiency and utilization of equipment.

According to a first aspect of the invention, the object is achieved by a method according to claim 1. According to a second aspect of the invention, the object is achieved by a system according to another independent claim. According to further aspects of the invention, the object is solved by computer-related items according to further independent claims.

The first aspect of the invention concerns a method for controlling unloading of at least a first load-carrying vehicle transporting a load of unprocessed material from a first location to a second location, wherein the second location comprises a first unloading target in the form of a material processing device and a second unloading target in the form of a local storage for unprocessed material.

As mentioned and indicated above the invention is in particular intended for a construction site where the load-carrying vehicle is a hauler or dump truck carrying rock fragments or similar and where the distance between the first and second locations is much longer than the distance between the first and second unloading targets. Typically, the distance between the first and second locations is some kilometres and the distance between the first and second unloading targets is in the range of around 20-100 m. Further, the local storage works as a local buffer for the processing device so unprocessed material, typically rock fragments, dumped at the local storage is intended to be used in the processing device.

The method comprises the steps of:

receiving a signal indicative of a current level of unprocessed material contained in the material processing device;

determining, based at least on the signal indicative of the current level of unprocessed material contained in the material processing device, whether an estimated level of unprocessed material contained in the material processing device is below or above a first threshold at an estimated time of arrival of the first load-carrying vehicle at the material processing device; and, directing the first load-carrying vehicle towards the first unloading target for unloading at the material processing device when the estimated level of unprocessed material contained in the material processing device is below the first threshold; or directing the first load-carrying vehicle towards the second unloading target for unloading at the local storage when the estimated level of unprocessed material contained in the material processing device is above the first threshold.

In short, the method reduces the risk that the processing device runs out of material, it reduces the amount of material being dumped at the local storage, which in turn leads to less work for e.g. a local loader vehicle having the task of transferring material from the local storage to the processing device, and it reduces the risk that vehicles need to line up and wait at the processing device before being allowed to dump its load.

The level of unprocessed material contained in the material processing device refers to the amount of material that has been dumped directly or indirectly (in)to the processing device but that yet has not been processed, such as rock fragments dumped into a buffering feeder of a crusher but that yet has not been crushed.

The first threshold of the level can be set to an upper limit at which dumping of further unprocessed material into the (feeder of the) material processing device is not allowed. That is, when the level is above the first threshold the processing device is "full" and vehicles arriving at the processing device must wait after arrival before being allowed to dump their load. If the level is above the first threshold, or will be above the first threshold when the vehicle is expected to arrive at the processing device, the vehicle is directed to the local storage instead to avoid waiting time at the processing machine. On the other hand, if the level is or will be below the first threshold the vehicle is directed to the processing device so as to avoid unnecessary dumping at the local storage.

The signal relating to the current material level may contain information obtained by a level sensor arranged on the processing device and may be sent from a transmitter that is arranged in connection with the sensor on the processing device and that is adapted to transmit wireless signals. As mentioned below, other possibilities are, however, possible for obtaining the current material level.

The level signal can be received by a receiver connected to a control unit that is configured to handle the signal and to determine whether the level is below or above the threshold and, based on this, decide towards which unloading target the vehicle should be directed. The receiver and the control unit may be arranged on the first load-carrying vehicle so as to form a distributed system but a central control system may alternatively be used, in which case a control signal can be sent to the vehicle about the selected unloading target.

In an embodiment the method comprises the steps of: receiving a signal indicative of a current geographical position of the first load-carrying vehicle; determining a distance between the first load-carrying vehicle and the material processing device based on the current geographical position of the first load-carrying vehicle and on information on available routes and a geographical position of the material processing device; and determining, based on the distance between the first load-carrying vehicle and the material processing device and on an expected average speed for the first load-carrying vehicle, the estimated time of arrival for the first load-carrying vehicle at the material processing device.

How to determine geographical positions (e.g. by GPS), distances, estimated time of arrival, etc. is well known as such. The expected average speed may be a default speed that commonly is used or a calculated average based on previous data.

In an embodiment the method comprises the steps of: providing information indicative of an expected processing rate of the material processing device, and determining, based on the expected processing rate of the material processing device, the estimated level of unprocessed material contained in the material processing device at the estimated time of arrival of the first load-carrying vehicle at the material processing device.

The expected processing rate can be a pre-set standard or average processing rate of the material crushing device, which is information that can be stored in beforehand in a memory accessible for a control unit. Such stored information may be considered to have been received previously (to connect to the term "received"). The expected processing rate may alternatively be based on measured (weighed) amounts of processed material (e.g. by using a scale at/below a conveyor belt at an outlet of the material crushing device) during a measurement period or it can be obtained from an average earlier dump rate at processing device (e.g. by keeping track of the weight of each individual earlier dumped load, calculating a total weight dumped between two points in time at which the level of unprocessed material contained in the material processing device is the same, and dividing the total dumped weight by the time between the two points in time).

In an embodiment the estimated level of unprocessed material is set to be the current level of unprocessed material and the estimated time of arrival of the first load-carrying vehicle is set to a current point in time, wherein the step of determining whether the estimated level of unprocessed material contained in the material processing device is below or above the first threshold at the estimated time of arrival of the first load-carrying vehicle at the material processing device is carried out by: determining whether the current level of unprocessed material contained in the material processing device is below or above the first threshold.

This simple form of the determination step is useful, for instance, when the first load-carrying vehicle is close to the material processing device and will arrive at the processing device within a short time interval during which the level of unprocessed material will change only a little, and when it is known or can be assumed that there is no further load-carrying vehicle ahead of the first load-carrying vehicle (where the further vehicle if so would unload at the material processing device before the first vehicle).

In an embodiment the method comprises the steps of: determining whether a second load-carrying vehicle that also transports a load of unprocessed material to the second location is ahead of the first load-carrying vehicle and has been directed towards the first unloading target for unloading at the material processing device; and when so, receiving a signal indicative of the amount of the load to be unloaded by the second load-carrying vehicle to the material processing device; and including the load to be unloaded by the second load-carrying vehicle to the material processing device when determining whether the estimated level of unprocessed material contained in the material processing device is below or above the first threshold at the estimated time of arrival of the first load-carrying vehicle at the material processing device.

The amount (weight) of the load of the second vehicle can be known by keeping track of the weight of each individual load (since all loads are normally weighed and the weight information can be sent to other vehicles or to central control system) or by setting a default value for all loads if all loads have substantially the same weight.

In an embodiment the method comprises the steps of: determining an estimated time of arrival for a third load-carrying vehicle at the material processing device, which third load-carrying vehicle also transports or is to transport a load of unprocessed material to the second location and which is the next load-carrying vehicle to arrive at the second location after the first load-carrying vehicle; determining, for the case that the load of the first load carrying vehicle is not unloaded at the material processing device, whether an estimated level of unprocessed material contained in the material processing device is below a second threshold at an estimated time of arrival of the third load-carrying vehicle at the material processing device; and, directing the first load-carrying vehicle towards the first unloading target for unloading at the material processing device when the estimated level of unprocessed material contained in the material processing device is below the second threshold at the estimated time of arrival of the third load-carrying vehicle at the material processing device even if the estimated level of unprocessed material contained in the material processing device is above the first threshold at the estimated time of arrival of the first load-carrying vehicle at the material processing device; or directing the first load-carrying vehicle towards the second unloading target for unloading at the local storage when the estimated level of unprocessed material contained in the material processing device is above the second threshold at the estimated time of arrival of the third load-carrying vehicle at the material processing device.

The purpose of this is that even if the material level in the processing device is expected to be above the first threshold at the expected time of arrival of the first vehicle it may take a long time before the next vehicle (the third vehicle) arrives at the processing device and in that case it is still desired to direct the first vehicle to the processing device to avoid or reduce the risk that the processing device runs out of material before the third vehicle arrives, even if the first vehicle possibly must wait some time before being allowed to dump its load. For general production efficiency it is usually better to let a vehicle spend some time waiting for unloading than to run out of material at the processing device.

In an embodiment the method is carried out at the latest when the first load-carrying vehicle has reached a destination decision point, wherein the destination decision point is located closer to the second location than to the first location and wherein the destination decision point is located at or close to a branching point where a path towards the second location branches and forms separate paths for reaching the first and second unloading targets so that the first load-carrying vehicle must be directed towards the material processing device or towards the local storage at the branching point.

In an embodiment the method is carried out when the first load-carrying vehicle has reached or is about to reach the destination decision point.

In an embodiment the method is carried out before the first load-carrying vehicle has reached or is about to reach the destination decision point.

The method may be run when the first vehicle is far away from the destination decision point and it may be run more or less continuously to obtain preliminary results and take preliminary decisions. A final decision on where to direct the vehicle and dump the load is preferably taken when the vehicle has reached the destination decision point. Typically, the distance between the destination decision point and the processing device and/or the local storage is ≤10% of the distance between the first and second locations.

In an embodiment information indicative of the current level of unprocessed material contained in the material processing device is obtained from a level sensor arranged in the material processing device. The level sensor may be arranged in a feeder of the processing device.

Such level information can be sent by wireless means from a transmitter arranged in connection with the sensor at the processing device to a receiver on a load-carrying vehicle (or to a central control system). As an alternative to the sensor, the information relating to the current level may be obtained from calculations involving i) a total amount (weight) of unprocessed material dumped into the processing device between a starting point and a current point in time (each vehicle may send a signal indicative of the weight f its load that has or will be unloaded at the processing device), ii) a total amount of material processed during the same time period (which can be calculated from a given expected processing rate or can be obtained from measurements (weighing) of the amount of processed material), and iii) a reference material level at the starting point. The information required for such calculations may be sent to the receiver on the vehicle, and a control unit connected to the receiver may carry out the calculations.

In an embodiment the method comprises the step of: adapting the speed of the first load-carrying vehicle so as to adapt the estimated time of arrival of the first load-carrying vehicle at the material processing device.

If determining in due time before the first load-carrying vehicle reaches the second location whether the estimated material level will be below the first threshold (and only preliminary deciding how to direct the vehicle), it is possible to increase or decrease the speed of the vehicle and thereby adapt the estimated time of arrival to be earlier or later in time than the initially estimated time of arrival. Another determination can then be carried out with the new faster or slower expected speed.

Vehicle speed adaptation can be used for various optimizations. One example is to reduce energy/fuel consumption as much as possible and therefore reduce vehicle speed so that the unprocessed material always (or as often as reasonably possible) is unloaded at the material processing device and thus that the speed is sufficiently slow to allow the estimated level to be below the first threshold when a final decision is to be taken where to direct the vehicle (i.e. to the processing device or to the local storage). Another example is to increase productivity (transported ton/h from first to second location) as much as possible and therefore increase vehicle speed as much as reasonably possible and unload at either the processing device or the local storage. The vehicle speed may also be adapted to other circumstances, such as unloading only at the processing device because the local storage is full or unloading only at local storage because the processing device is stopped for some reason.

In an embodiment the material processing device is a crusher device configured to crush rock fragments into smaller fragments. In such a case the uncrushed rock fragments form the unprocessed material. Alternatively, the material processing device can be e.g. a mixing plant or a load pocket where rock fragments or other materials can be handled or processed. It should be noted that the term "processing device" is used in this disclosure to cover also mixing plants, load pockets, etc.

In an embodiment the first load-carrying vehicle is a hauler or dump truck provided with a load-container adapted to receive a load of material in the form of rock fragments, gravel, sand and the like.

In an embodiment the method comprises the steps of: receiving, by means of a receiver that is configured to receive wireless signals and that is arranged on the first load-carrying vehicle, the signal indicative of the current level of unprocessed material contained in the material processing device; determining, by means of a control unit arranged on the first load-carrying vehicle and connected to the receiver, whether the estimated level of unprocessed material contained in the material processing device is below or above the first threshold at the estimated time of arrival of the first load-carrying vehicle at the material processing device; and, directing, by means of the control unit, the first load-carrying vehicle towards either the first or the second unloading target depending on the estimated material level.

The step of directing the vehicle towards the first or second unloading target may be to indicate on a display to a driver of the vehicle which unloading target to go to or may be to actually control and steer the vehicle to the selected unloading target for an autonomous load-carrying vehicle.

The method may alternatively involve a central control system configured to receive the signal relating to the current material level and to determine towards which unloading target the vehicle should be directed. A control signal can then be sent to the vehicle, for instance in the form of a display indication to a driver or a steering signal to an autonomous vehicle.

Preferably, each load-carrying vehicle involved in the method is provided with both a receiver and a transmitter for receiving information not only about level of unprocessed material in the processing device but also for receiving and sending information about its own and other vehicles' geographical position, weight of load, speed, etc. Such receiver and transmitter are preferably connected to an on-board control unit that is capable of not only determining time of arrival for various vehicles and controlling where to unload but also to control speed, navigation, unloading etc. (via driver inputs for conventional vehicles and directly for autonomous vehicles).

In an embodiment the first threshold of the level of unprocessed material contained in the material processing device is an upper limit at which dumping of further unprocessed material into the material processing device is not allowed.

In an embodiment the second threshold of the level of unprocessed material contained in the material processing device is a lower limit indicating that the material processing device has or is about to run out of unprocessed material. The system of the invention concerns to a system for controlling unloading of at least a first load-carrying vehicle transporting a load of unprocessed material from a first location to a second location, wherein the second location comprises a first unloading target in the form of a material processing device and a second unloading target in the form of a local storage for unprocessed material.

The system is configured to:

receive a signal indicative of a current level of unprocessed material contained in the material processing device;

determine, based at least on the signal indicative of the current level of unprocessed material contained in the material processing device, whether an estimated level of unprocessed material contained in the material processing device is below or above a first threshold at an estimated time of arrival of the first load-carrying vehicle at the material processing device; and, direct the first load-carrying vehicle towards the first unloading target for unloading at the material processing device when the estimated level of unprocessed material contained in the material processing device is below the first threshold; or direct the first load-carrying vehicle towards the second unloading target for unloading at the local storage when the estimated level of unprocessed material contained in the material processing device is above the first threshold.

In an embodiment the first load-carrying vehicle is provided with a receiver configured to receive a wireless signal indicative of the current level of unprocessed material contained in the material processing device, and wherein the first load-carrying vehicle is provided with a control unit connected to the receiver, said control unit being configured to determine whether the estimated level of unprocessed material contained in the material processing device is below or above the first threshold at the estimated time of arrival of the first load-carrying vehicle at the material processing device and to direct the first load-carrying vehicle towards either the first or the second unloading target depending on the estimated material level.

In an embodiment the first load-carrying vehicle is provided with a transmitter configured to transmit to other load-carrying vehicles and/or to a central control system information on at least its geographical position.

In an embodiment the first load-carrying vehicle is a hauler or dump truck provided with a load-container adapted to receive a load of material in the form of rock fragments, gravel, sand and the like.

The computer-related items concerns:

A computer program product comprising program code means for performing the steps of the method above when said program is run on a computer.

A computer readable medium carrying a computer program comprising program code means for performing the steps of the method above when said program product is run on a computer.

A control unit for controlling operation of a load-carrying vehicle, the control unit being configured to perform the steps of the above method.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
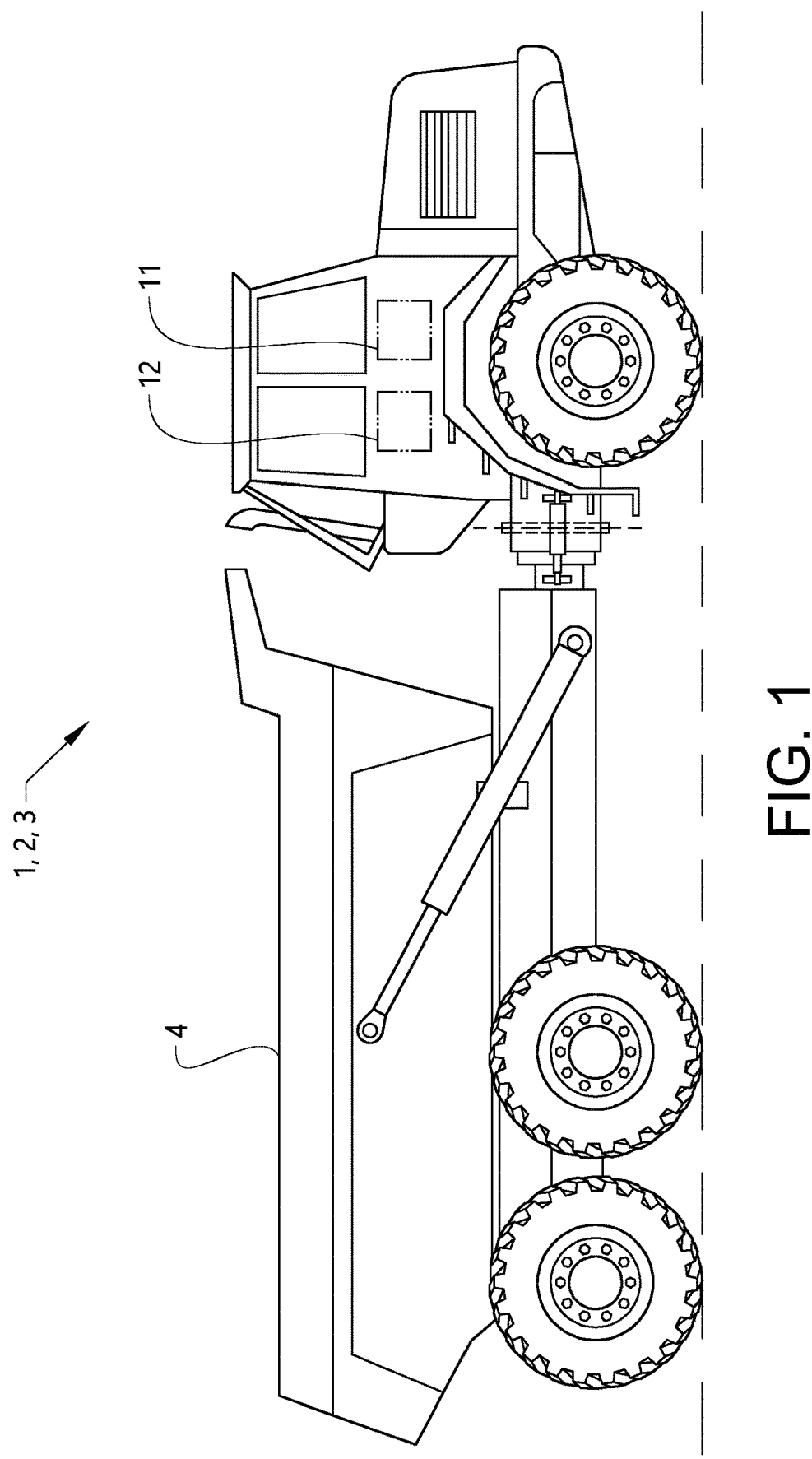
FIG. 1 shows an example of a load-carrying vehicle in the form of an articulated hauler.

FIG. 1 shows an example of a load-carrying vehicle 1, 2, 3 in the form of an articulated hauler provided with a receiver and transmitter 11, a control unit 12 and a load-container 4 adapted to receive a load of material in the form of rock fragments, gravel, sand and the like. The receiver/transmitter 11 is configured to receive various wireless signals, such as signals indicative of: a current level of unprocessed material contained in the material processing device 7 (see FIG. 2), current positions and speeds of other load-carrying vehicles, the weight of the loads carried by other vehicles, etc. The receiver/transmitter 11 is further configured to transmit to other load-carrying vehicles information on geographical position, speed, weight of load, etc. related to the vehicle it is arranged on.

The load-carrying vehicle 1, 2, 3 is further provided with a control unit 12 connected to the receiver/transmitter 11, wherein the control unit 12 is arranged to control reception and transmission of signals to/from the receiver/transmitter 11. The control unit 12 is further configured to carry out various calculations and comparisons, such as to estimate time of arrival for various vehicles at the material processing device and to determine whether the estimated level of unprocessed material contained in the material processing device 7 is below or above a certain threshold at a certain point in time. The control unit 12 is also configured to control operation of the load-carrying vehicle 1, 2, 3 including to direct the load-carrying vehicle 1, 2, 3 towards either the first or the second unloading target depending on various input, where the directing may be of an indirect type for conventional vehicles, such as an indication on a display to inform a driver, or a direct steering command for an autonomous vehicle.

The control unit 12 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Figure 2:
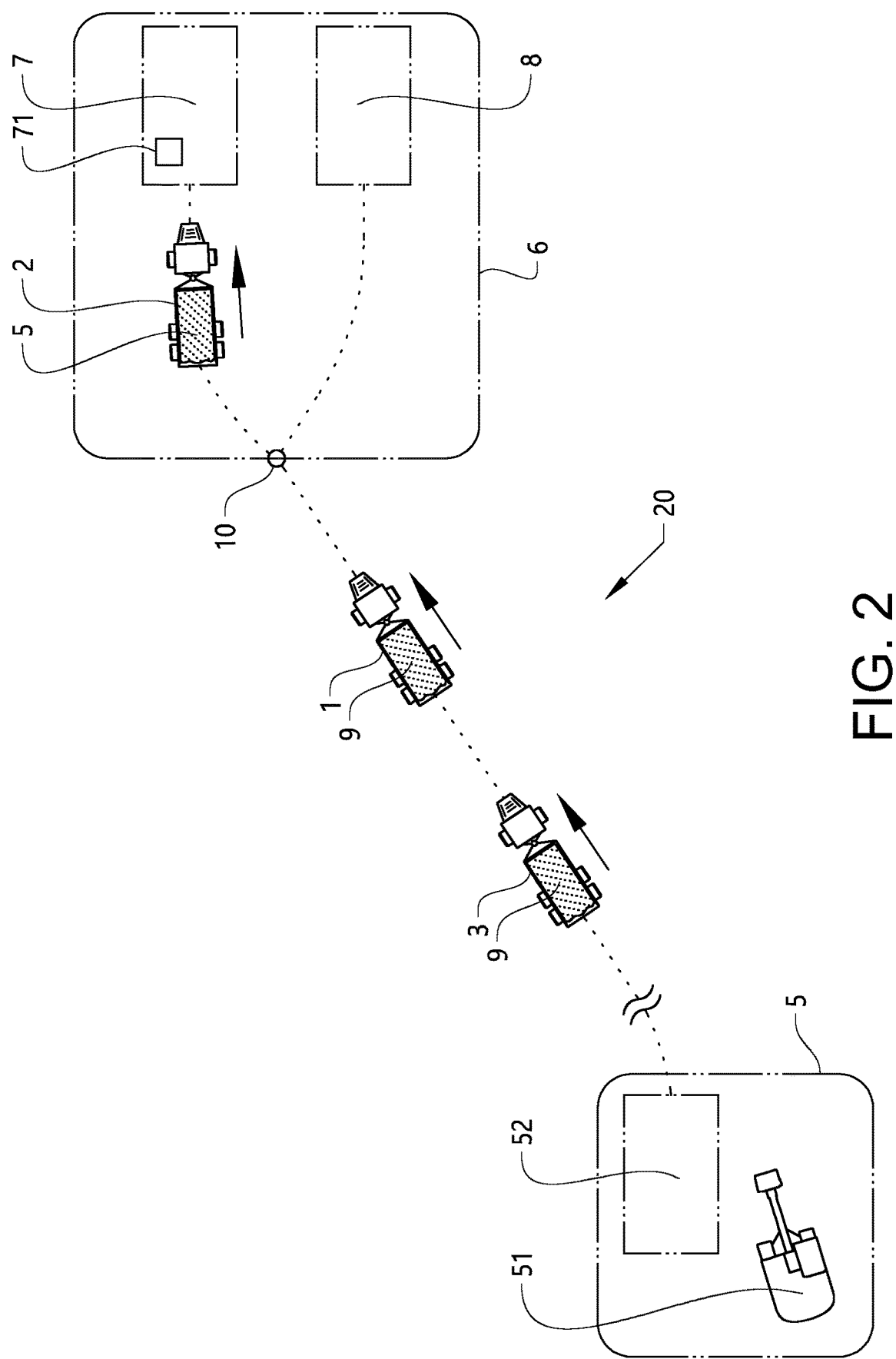
FIG. 2 shows a schematic view of an embodiment of a system according to the invention.

FIG. 2 shows a schematic view of an embodiment of a system 20 for controlling unloading of at least a first load-carrying vehicle 1 transporting a load of unprocessed material 9 from a first location 5 to a second location 6, wherein the second location 6 comprises a first unloading target in the form of a material processing device 7 and a second unloading target in the form of a local storage 8 for unprocessed material. The local material storage 8 works as a local buffer for the material processing device 7. A loader vehicle or other arrangement (not shown) may be arranged to transport unprocessed material from the storage 8 to the processing device 7.

As noted above FIG. 2 is schematic and in practice the distance between the first and second locations 5, 6 is typically some kilometres and the distance between the processing device 7 and the local storage 8 may be around 20-100 m.

FIG. 2 also shows a destination decision point 10 that is located closer to the second location 6 than to the first location 5. The destination decision point 10 is, as indicated in FIG. 2, located at a branching point where a path towards the second location 6 branches and forms separate paths for reaching the first and second unloading targets so that the first load-carrying vehicle 1 must be directed towards the material processing device 7 or towards the local storage 8 at the branching point. At the latest when the load-carrying vehicle 1, 2, 3 reaches the position of the decision point 10 it should be decided whether to direct the vehicle towards the processing device 7 or the local storage 8. The decision point 10 may be located e.g. 100-200 m from the processing device 7 and local storage 8 (or, for instance, may be located close to the local storage 8 and some hundreds of meters from the processing device 7).

The first location 5 forms a loading location and to illustrate this it is indicated in FIG. 2 a loading vehicle in the form of an excavator 51 and a loading zone 52.

FIG. 2 further shows, besides the first load-carrying vehicle 1, a second and a third load-carrying vehicle 2, 3, wherein each vehicle 1, 2, 3 carries a load of unprocessed material 9 and moves from the loading location 5 towards the unloading targets in the second (unloading) location 6. Each of these first, second and third load-carrying vehicles 1, 2, 3 corresponds to the vehicle exemplified in FIG. 1, i.e. in this example all load-carrying vehicles 1, 2, 3 are identical. It may be noted that what here is denoted the first vehicle 1 is the vehicle in the middle of the three vehicles in FIG. 2.

The second vehicle 2 has passed the destination decision point 10 and has been directed towards the material processing device 7, whereas the first and third vehicle 1, 3 are on their way towards the second location 6 and the decision point 10. Again it should be noted that FIG. 2 is only schematic, for instance, the relative size of the vehicles 1, 2, 3, 51 has been exaggerated. In reality the loading and unloading locations 5, 6 are typically much larger than the vehicles 1, 2, 3, 51 and the distance between the load-carrying vehicles 1, 2, 3 may be much larger than what FIG. 2 might give the impression of. Further, FIG. 2 indicates that the second vehicle 2 is on its way towards the first unloading target for unloading at the processing device 7 but it has not been indicated that the vehicle typically would move backwards the last distance before unloading.

A level sensor 71 is arranged in the material processing device 7. The level sensor 71 measures the level of unprocessed material in a feeder (not shown) of the processing device 7. The level sensor 71 is connected to a transmitter (indicated by the same reference number 71 as the sensor) that can transmit a signal comprising information on the current level of material in the feeder of the processing device 7 and this signal can be received by the receiver 11 of each of the vehicles 1, 2, 3. Information indicative of the current level of unprocessed material contained in the material processing device 7 can thus be obtained from the level sensor 71 arranged in the material processing device 7.

Figure 3:
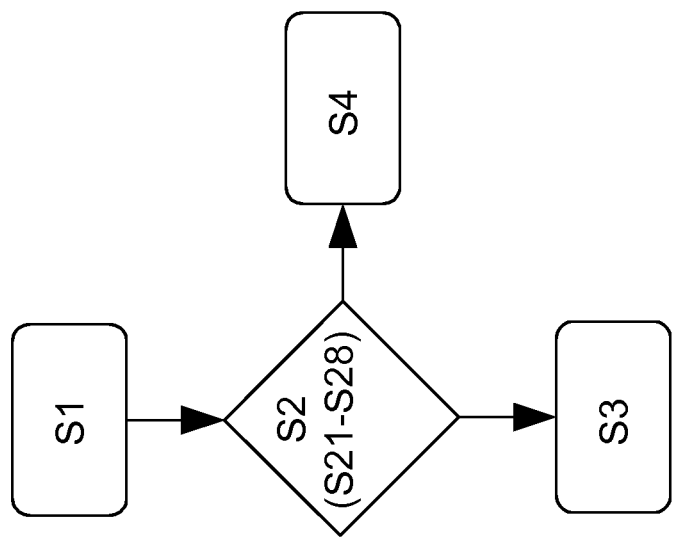
FIG. 3 shows a flow chart for a method according to the invention.

FIG. 3 shows a general form of a method for controlling the system 20 comprising the steps of:

S1—receiving a signal indicative of a current level of unprocessed material contained in the material processing device 7;

S2—determining, based at least on the signal indicative of the current level of unprocessed material contained in the material processing device 7, whether an estimated level of unprocessed material contained in the material processing device 7 is below or above a first threshold at an estimated time of arrival of the first load-carrying vehicle 1 at the material processing device 7; and S3—directing the first load-carrying vehicle 1 towards the first unloading target for unloading at the material processing device 7 when the estimated level of unprocessed material contained in the material processing device 7 is below the first threshold; or S4—directing the first load-carrying vehicle 1 towards the second unloading target for unloading at the local storage 8 when the estimated level of unprocessed material contained in the material processing device 7 is above the first threshold.

The first threshold of the level of unprocessed material contained in the material processing device 7 is in this case set to an upper limit at which dumping of further unprocessed material into the material processing device 7 is not allowed. If the level is above the upper limit one must wait until the level decreases to or below the upper limit before being allowed to dump more material into the processing device 7 so to avoid waiting time when the level is above the first threshold it is normally decided to direct the first vehicle towards the local storage 8 and dump the load there instead.

The method is carried out when the first load-carrying vehicle 1 has reached or is about to reach the destination decision point 10. To obtain preliminary results and take preliminary decisions the method is also carried out before the first load-carrying vehicle 1 has reached or is about to reach the destination decision point 10.

The method may comprise the following steps that may be considered to be included in a variant of step S2:

S21—receiving a signal indicative of a current geographical position of the first load-carrying vehicle 1;

S22—determining a distance between the first load-carrying vehicle 1 and the material processing device 7 based on the current geographical position of the first load-carrying vehicle 1 and on information on available routes and a geographical position of the material processing device 7; and S23—determining, based on the distance between the first load-carrying vehicle 1 and the material processing device 7 and on an expected average speed for the first load-carrying vehicle 1, the estimated time of arrival for the first load-carrying vehicle at the material processing device 7.

Steps S21-S23 can for instance be carried out by: providing the first vehicle 1 with a GPS system; storing data on available routes (in this case possibly only one single route), the geographical position of the material processing device 7, and the expected average speed (that may be pre-set default speed) in a memory accessible for the control unit 12, and configuring the control unit 12 to calculate the estimated time of arrival. All this is known as such.

The method may also comprise the following steps that may be considered to be included in a further variant of step S2:

S24—providing information indicative of an expected processing rate of the material processing device 7, and S25—determining, based on the expected processing rate of the material processing device 7, the estimated level of unprocessed material contained in the material processing device 7 at the estimated time of arrival of the first load-carrying vehicle 1 at the material processing device 7.

The expected processing rate can be a pre-set standard or average processing rate of the material crushing device 7, for instance given in tonnes/h, and can be stored in beforehand in a memory accessible for the control unit 12.

In particular when the first load-carrying vehicle 1 is close to the destination decision point 10, when the decision point 10 is relatively close to the processing device 7 and when there is no further load-carrying vehicle in front of the first load-carrying vehicle 1 (which here, however, is in FIG. 2 in the form of the second vehicle 2), the estimated level of unprocessed material can be set to the current level of unprocessed material and the estimated time of arrival for the first load-carrying vehicle 1 can be set to a current point in time without losing much accuracy. Steps S21-S25 may then be left out and step S2 may be simplified in that determining whether the estimated level of unprocessed material contained in the material processing device 7 is below or above the first threshold at the estimated time of arrival of the first load-carrying vehicle 1 at the material processing device 7 can be carried out by: determining whether the current level of unprocessed material contained in the material processing device 7 is below or above the first threshold 1.

To take into account a further load-carrying vehicle that is ahead of the first load-carrying vehicle 1 the method may comprise the following steps that may be considered to be included in still a further variant of step S2:

S26—determining whether the second load-carrying vehicle 2 that also transports a load of unprocessed material to the second location 6 is ahead of the first load-carrying vehicle 1 and has been directed towards the first unloading target for unloading at the material processing device 7 (which it has as indicated in FIG. 2); and when so, S27—receiving a signal indicative of the amount of the load to be unloaded by the second load-carrying vehicle 2 to the material processing device 7; and S28—including the load to be unloaded by the second load-carrying vehicle 2 to the material processing device 7 when determining whether the estimated level of unprocessed material contained in the material processing device 7 is below or above the first threshold at the estimated time of arrival of the first load-carrying vehicle 1 at the material processing device 7.

As mentioned above the second vehicle 2 can send information on its position and its load weight to the first vehicle 1. By including in step S28 the load to be dumped by the second vehicle 2 it may be that the first vehicle 1 is directed towards the local storage 8 instead of towards the processing device 7 even if the current material level is below the first threshold (for instance if it is calculated that the load to be dumped by the second vehicle 2 will raise the material level to above the first threshold).

FIG. 3 also indicates that some or all of steps S21-S28 may be included in step S2.

To take into account a further load-carrying vehicle that is behind of the first load-carrying vehicle 1 the method may comprise the following steps that preferably is carried if it is determined in step S2 that the level is above the first threshold but not necessarily if the level is below the threshold (since in that case the first load-carrying vehicle 1 is directed to the processing device 7 anyway):

S51—determining an estimated time of arrival for the third load-carrying vehicle 3 at the material processing device 7, which third load-carrying vehicle 3 also transports or is to transport a load of unprocessed material to the second location 6 and which is the next load-carrying vehicle to arrive at the second location 6 after the first load-carrying vehicle 1;

S52—determining, for the case that the load of the first load carrying vehicle 1 is not unloaded at the material processing device 7, whether an estimated level of unprocessed material contained in the material processing device 7 is below a second threshold at an estimated time of arrival of the third load-carrying vehicle 3 at the material processing device 7; and S53—directing the first load-carrying vehicle 1 towards the first unloading target for unloading at the material processing device 7 when the estimated level of unprocessed material contained in the material processing device 7 is below the second threshold at the estimated time of arrival of the third load-carrying vehicle 3 at the material processing device 7 even if the estimated level of unprocessed material contained in the material processing device 7 is above the first threshold at the estimated time of arrival of the first load-carrying vehicle 1 at the material processing device 7; or S54—directing the first load-carrying vehicle 1 towards the second unloading target for unloading at the local storage 8 when the estimated level of unprocessed material contained in the material processing device 7 is above the second threshold at the estimated time of arrival of the third load-carrying vehicle 3 at the material processing device 7.

Figure 4:
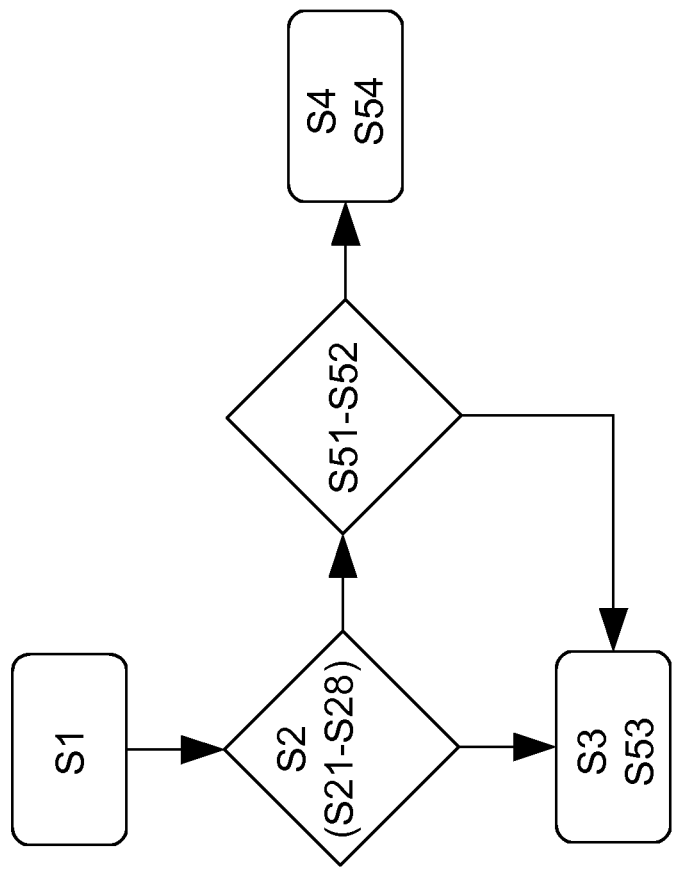
FIG. 4 shows a flow chart of a variant of a method according to the invention.

FIG. 4 shows a variant of the method comprising the steps S51-S54.

The second threshold of the level of unprocessed material contained in the material processing device 7 is in this case set to a lower limit indicating that the material processing device has or is about to run out of unprocessed material.

If there is a relatively long distance between the first and third vehicles 1, 3 (much longer than indicated in the schematic FIG. 2), or at least if a relatively long time period will pass until arrival of the third vehicle 3, the first vehicle 1 may according to step S53 be directed towards the processing device 7 even if the current or estimated level of unprocessed material contained in the material processing device 7 is above the first threshold at the estimated time of arrival of the first load-carrying vehicle 1 at the material processing device 7. The first vehicle 1 might then need to wait some time before unloading at the processing device 7 but that is usually better than taking the risk that the processing device 7 runs out of material before the third vehicle 7 will arrive.

It is to be understood that the present invention is not limited to the embodiments described above and illustrated in the drawings; rather, the skilled person will recognize that many changes and modifications may be made within the scope of the appended claims.

The invention claimed is:

1. Method for controlling unloading of at least a first load-carrying vehicle transporting a load of unprocessed material from a first location to a second location, wherein the second location comprises a first unloading target in the form of a material processing device and a second unloading target in the form of a local storage for unprocessed material, wherein the method comprises:
receiving a signal indicative of a current level of unprocessed material contained in the material processing device;
determining, based at least on the signal indicative of the current level of unprocessed material contained in the material processing device, whether an estimated level of unprocessed material contained in the material processing device is below or above a first threshold at an estimated time of arrival of the first load-carrying vehicle at the material processing device;
directing the first load-carrying vehicle towards the first unloading target for unloading at the material processing device when the estimated level of unprocessed material contained in the material processing device is below the first threshold; or
directing the first load-carrying vehicle towards the second unloading target for unloading at the local storage when the estimated level of unprocessed material contained in the material processing device is above the first threshold;
determining an estimated time of arrival for a third load-carrying vehicle at the material processing device, which third load-carrying vehicle also transports or is to transport a load of unprocessed material to the second location and which is the next load-carrying vehicle to arrive at the second location after the first load-carrying vehicle;
determining, when the load of the first load carrying vehicle is not unloaded at the material processing device, whether an estimated level of unprocessed material contained in the material processing device is below a second threshold at an estimated time of arrival of the third load-carrying vehicle at the material processing device; and
directing the first load-carrying vehicle towards the first unloading target for unloading at the material processing device when the estimated level of unprocessed material contained in the material processing device is below the second threshold at the estimated time of arrival of the third load-carrying vehicle at the material processing device even if the estimated level of unprocessed material contained in the material processing device is above the first threshold at the estimated time of arrival of the first load-carrying vehicle at the material processing device; or directing the first load-carrying vehicle towards the second unloading target for unloading at the local storage when the estimated level of unprocessed material contained in the material processing device is above the second threshold at the estimated time of arrival of the third load-carrying vehicle at the material processing device.

2. Method according to claim 1, wherein the method further comprises:
receiving a signal indicative of a current geographical position of the first load-carrying vehicle;
determining a distance between the first load-carrying vehicle and the material processing device based on the current geographical position of the first load-carrying vehicle and on information on available routes and a geographical position of the material processing device; and
determining, based on the distance between the first load-carrying vehicle and the material processing device and on an expected average speed for the first load-carrying vehicle, the estimated time of arrival for the first load-carrying vehicle at the material processing device.

3. Method according to claim 1, wherein the method further comprises:
providing information indicative of an expected processing rate of the material processing device, and
determining, based on the expected processing rate of the material processing device, the estimated level of unprocessed material contained in the material processing device at the estimated time of arrival of the first load-carrying vehicle at the material processing device.

4. Method according to claim 1, wherein the estimated level of unprocessed material is set to be the current level of unprocessed material and wherein the estimated time of arrival of the first load-carrying vehicle is set to a current point in time, wherein the step of determining whether the estimated level of unprocessed material contained in the material processing device is below or above the first threshold at the estimated time of arrival of the first load-carrying vehicle at the material processing device is carried out by:
determining whether the current level of unprocessed material contained in the material
processing device is below or above the first threshold.

5. Method according to claim 1, wherein the method further comprises:
determining whether a second load-carrying vehicle that also transports a load of unprocessed material to the second location is ahead of the first load-carrying vehicle and has been directed towards the first unloading target for unloading at the material processing device; and when so,
receiving a signal indicative of the amount of the load to be unloaded by the second load-carrying vehicle to the material processing device; and
including the load to be unloaded by the second load-carrying vehicle to the material processing device when determining whether the estimated level of unprocessed material contained in the material processing device is below or above the first threshold at the estimated time of arrival of the first load-carrying vehicle at the material processing device.

6. Method according to claim 1, wherein the method is carried out at the latest when the first load-carrying vehicle has reached a destination decision point, wherein the destination decision point is located closer to the second location than to the first location and wherein the destination decision point is located at or located close to a branching point where a path towards the second location branches and forms separate paths for reaching the first and second unloading targets so that the first load-carrying vehicle must be directed towards the material processing device or towards the local storage at the branching point.

7. Method according to claim 1, wherein the method is carried out at the latest when the first load-carrying vehicle is going to reach a destination decision point, wherein the destination decision point is located closer to the second location than to the first location and wherein the destination decision point is located at or located close to a branching point where a path towards the second location branches and forms separate paths for reaching the first and second unloading targets so that the first load-carrying vehicle must be directed towards the material processing device or towards the local storage at the branching point.

8. Method according to claim 1, wherein the method is carried out before the first load-carrying vehicle has reached, or before the first load-carrying vehicle is going to reach, a destination decision point, wherein the destination decision point is located closer to the second location than to the first location and wherein the destination decision point is located at or located close to a branching point where a path towards the second location branches and forms separate paths for reaching the first and second unloading targets so that the first load-carrying vehicle must be directed towards the material processing device or towards the local storage at the branching point.

9. Method according to claim 1, wherein information indicative of the current level of unprocessed material contained in the material processing device is obtained from a level sensor arranged in the material processing device.

10. Method according to claim 1, wherein the method further comprises:
adapting the speed of the first load-carrying vehicle so as to adapt the estimated time of arrival of the first load-carrying vehicle at the material processing device.

11. Method according to claim 1, wherein the material processing device is a crusher device configured to crush rock fragments into smaller fragments.

12. Method according to claim 1, wherein the first load-carrying vehicle is a hauler or dump truck provided with a load-container adapted to receive a load of material in the form of rock fragments, gravel, sand and the like.

13. Method according to claim 1, wherein the method further comprises:
receiving, by means of a receiver that is configured to receive wireless signals and that is arranged on the first load-carrying vehicle, the signal indicative of the current level of unprocessed material contained in the material processing device;
determining, by means of a control unit arranged on the first load-carrying vehicle and connected to the receiver, whether the estimated level of unprocessed material contained in the material processing device is below or above the first threshold at the estimated time of arrival of the first load-carrying vehicle at the material processing device; and,
directing, by means of the control unit, the first load-carrying vehicle towards either the first or the second unloading target depending on the estimated material level.

14. Method according to claim 1, wherein the first threshold of the level of unprocessed material contained in the material processing device is an upper limit at which dumping of further unprocessed material into the material processing device is not allowed.

15. Method according to claim 1, wherein the second threshold of the level of unprocessed material contained in the material processing device is a lower limit indicating that the material processing device has or is about to run out of unprocessed material.

16. A non-transitory computer readable medium carrying a computer program comprising program code means for performing the method according to claim 1 when said program product is run on a computer.

17. A control unit for controlling operation of a load-carrying vehicle, the control unit being configured to perform the method according to claim 1.

18. System for controlling unloading of at least a first load-carrying vehicle transporting a load of unprocessed material from a first location to a second location, wherein the second location comprises a first unloading target in the form of a material processing device and a second unloading target in the form of a local storage for unprocessed material, wherein the system is configured to perform operations comprising:
receiving a signal indicative of a current level of unprocessed material contained in the material processing device;
determining, based at least on the signal indicative of the current level of unprocessed material contained in the material processing device, whether an estimated level of unprocessed material contained in the material processing device is below or above a first threshold at an estimated time of arrival of the first load-carrying vehicle at the material processing device;
directing the first load-carrying vehicle towards the first unloading target for unloading at the material processing device when the estimated level of unprocessed material contained in the material processing device is below the first threshold; or
directing the first load-carrying vehicle towards the second unloading target for unloading at the local storage when the estimated level of unprocessed material contained in the material processing device is above the first threshold
determining an estimated time of arrival for a third load-carrying vehicle at the material processing device, which third load-carrying vehicle also transports or is to transport a load of unprocessed material to the second location and which is the next load-carrying vehicle to arrive at the second location after the first load-carrying vehicle;
determining, when the load of the first load carrying vehicle is not unloaded at the material processing device, whether an estimated level of unprocessed material contained in the material processing device is below a second threshold at an estimated time of arrival of the third load-carrying vehicle at the material processing device; and
directing the first load-carrying vehicle towards the first unloading target for unloading at the material processing device when the estimated level of unprocessed material contained in the material processing device is below the second threshold at the estimated time of arrival of the third load-carrying vehicle at the material processing device even if the estimated level of unprocessed material contained in the material processing device is above the first threshold at the estimated time of arrival of the first load-carrying vehicle at the material processing device; or directing the first load-carrying vehicle towards the second unloading target for unloading at the local storage when the estimated level of unprocessed material contained in the material processing device is above the second threshold at the estimated time of arrival of the third load-carrying vehicle at the material processing device.

19. System according to claim 18, wherein the first load-carrying vehicle is provided with a receiver configured to receive a wireless signal indicative of the current level of unprocessed material contained in the material processing device, and wherein the first load-carrying vehicle is provided with a control unit connected to the receiver, said control unit being configured to determine whether the estimated level of unprocessed material contained in the material processing device is below or above the first threshold at the estimated time of arrival of the first load-carrying vehicle at the material processing device and to direct the first load-carrying vehicle towards either the first or the second unloading target depending on the estimated material level.

20. System according to claim 18, wherein the first load-carrying vehicle is provided with a transmitter configured to transmit to other load-carrying vehicles and/or to a central control system information on at least its geographical position.

21. System according to claim 18, wherein the first load-carrying vehicle (1) is a hauler or dump truck provided with a load-container adapted to receive a load of material in the form of rock fragments, gravel, sand and the like.

\* \* \* \* \*